United States Patent
Heim et al.

(10) Patent No.: US 9,883,626 B2
(45) Date of Patent: Feb. 6, 2018

(54) CONTROLLING AN AGRICULTURAL VEHICLE BASED ON SENSED INPUTS

(71) Applicant: Deere & Company, Moline, IL (US)

(72) Inventors: Brianna L. Heim, Byron, IL (US); Charles T. Graham, Co Springs, CO (US); James R. Peterson, Annawan, IL (US); Donald Landphair, Bettendorf, IA (US); James Z. Liu, Venice, FL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/874,211

(22) Filed: Oct. 2, 2015

(65) Prior Publication Data

US 2017/0094894 A1    Apr. 6, 2017

(51) Int. Cl.
| | | |
|---|---|---|
| *A01C 7/18* | (2006.01) | |
| *A01C 7/10* | (2006.01) | |
| *B60W 30/18* | (2012.01) | |
| *A01C 7/20* | (2006.01) | |
| *A01C 5/06* | (2006.01) | |

(52) U.S. Cl.
CPC .............. *A01C 7/105* (2013.01); *A01C 5/064* (2013.01); *A01C 7/203* (2013.01); *B60W 30/18* (2013.01); *B60W 2300/152* (2013.01); *B60W 2720/10* (2013.01)

(58) Field of Classification Search
None
See application file for complete search history.

(56) References Cited

U.S. PATENT DOCUMENTS

| | | | | |
|---|---|---|---|---|
| 5,956,255 A * | 9/1999 | Flamme | ............... | A01B 79/005 111/903 |
| 6,003,455 A * | 12/1999 | Flamme | ................... | A01C 7/06 111/200 |
| 6,070,538 A * | 6/2000 | Flamme | ............... | A01B 79/005 111/170 |
| 6,070,539 A * | 6/2000 | Flamme | ............... | A01B 79/005 111/177 |
| 6,079,340 A * | 6/2000 | Flamme | ............... | A01B 79/005 111/178 |
| 6,144,910 A * | 11/2000 | Scarlett | ................ | A01B 63/023 172/4.5 |
| 6,942,595 B2 * | 9/2005 | Hrazdera | ............. | A01B 61/025 180/53.6 |
| 7,574,290 B2 * | 8/2009 | Gibson | ................ | A01B 69/008 177/2 |
| 7,954,556 B2 * | 6/2011 | Hou | ...................... | A01B 63/112 172/3 |
| 8,078,367 B2 | 12/2011 | Sauder et al. | | |
| 8,162,070 B2 * | 4/2012 | Smith | .................... | G05D 19/02 172/2 |
| 8,311,709 B2 * | 11/2012 | Vanhercke | ............ | A01F 15/085 180/53.6 |
| 8,448,587 B2 * | 5/2013 | Kowalchuk | ............ | A01C 7/105 111/200 |

(Continued)

*Primary Examiner* — Jonathan M Dager
(74) *Attorney, Agent, or Firm* — Joseph R. Kelly; Kelly, Holt & Christenson P.L.L.C.

(57) ABSTRACT

A variable is sensed that is indicative of a performance of a machine. A rate of change of the sensed variable is determined, and a control signal is generated for controlling an agricultural vehicle, based upon the rate of change in the value of the sensed variable.

20 Claims, 5 Drawing Sheets

(56) References Cited

U.S. PATENT DOCUMENTS

| | | | |
|---|---|---|---|
| 8,543,295 B2* | 9/2013 | Bryant | B60T 8/175 701/42 |
| 8,738,244 B2* | 5/2014 | Lenz | A01L 363/00 340/468 |
| 9,226,442 B2* | 1/2016 | Grimm | A01C 7/06 |
| 9,282,688 B2* | 3/2016 | Casper | H04N 7/183 |
| 9,554,098 B2* | 1/2017 | Casper | H04N 7/181 |
| 2001/0042362 A1* | 11/2001 | Scarlett | A01F 15/00 56/10.2 G |
| 2006/0108127 A1* | 5/2006 | Batthala | A01B 63/1117 172/2 |
| 2009/0078178 A1* | 3/2009 | Beaujot | A01C 7/084 111/170 |
| 2010/0010667 A1* | 1/2010 | Sauder | A01B 79/005 700/231 |
| 2011/0184551 A1* | 7/2011 | Kowalchuk | A01C 7/105 700/219 |
| 2012/0191307 A1* | 7/2012 | Matsuzaki | B60W 10/06 701/51 |
| 2013/0041549 A1* | 2/2013 | Reeve | B62D 15/025 701/28 |
| 2013/0085598 A1* | 4/2013 | Kowalchuk | A01C 7/081 700/231 |
| 2013/0233088 A1* | 9/2013 | Noble | A01C 7/105 73/861 |
| 2014/0041563 A1* | 2/2014 | Henry | A01B 79/005 111/139 |
| 2014/0116017 A1* | 5/2014 | Hunt | A01D 34/006 56/10.2 R |
| 2014/0180579 A1* | 6/2014 | Friend | G01B 11/00 701/469 |
| 2014/0196919 A1* | 7/2014 | Kowalchuk | A01B 63/002 172/2 |
| 2015/0379785 A1* | 12/2015 | Brown, Jr. | A01B 79/005 701/29.1 |
| 2016/0066500 A1* | 3/2016 | Bruns | A01C 5/064 111/163 |
| 2016/0088787 A1* | 3/2016 | Connell | A01B 76/00 701/50 |
| 2016/0091898 A1* | 3/2016 | Booher | G05D 1/0274 701/26 |
| 2016/0120097 A1* | 5/2016 | Chahley | G05D 7/0617 701/50 |
| 2016/0121900 A1* | 5/2016 | Yoshizawa | E02F 9/2246 701/50 |

* cited by examiner

CONTROLLING AN AGRICULTURAL VEHICLE BASED ON SENSED INPUTS

FIELD OF THE DESCRIPTION

The present description relates to machine control. More specifically, the present description relates to controlling an agricultural vehicle based upon sensed information.

BACKGROUND

There are a wide variety of different types of agricultural machines. Some include seeding or planting machines, balers, tilling implements, sprayers, etc. Planting machines, themselves, include row crop planters, grain drills, air seeders, and the like. These machines place seeds at a desired depth, within a plurality of parallel seed trenches that are formed in the soil.

Crop yields can depend on a wide variety of different factors. Some of those factors have to do with the performance of the planting machine in planting the seed or other implements. For instance, the crop yield can depend on the seed spacing, the seed depth, and the seed-to-soil contact when the seed is planted.

The discussion above is merely provided for general background information and is not intended to be used as an aid in determining the scope of the claimed subject matter.

SUMMARY

A variable is sensed that is indicative of a performance of a machine. A rate of change of the sensed variable is determined, and a control signal is generated for controlling an agricultural vehicle, based upon the rate of change in the value of the sensed variable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present discussion applies to a wide variety of different types of machines. For instance, it can apply to towed implements, such as planting machines, tillage implements, balers, etc. It can also apply to self-propelled machines. Each of these categories of machines includes several different types of machines. For instance, planting machines include row crop planters, grain drills (or box drills), air seeders, etc. The present discussion proceeds with respect to an example in which the machine is a planting machine, and the planting machine is a row crop planter, that is towed by a towing vehicle, such as a tractor. However, it will be appreciated that this is only one example, and the discussion could just as easily apply to the other types of machines as well.

Figure 1:
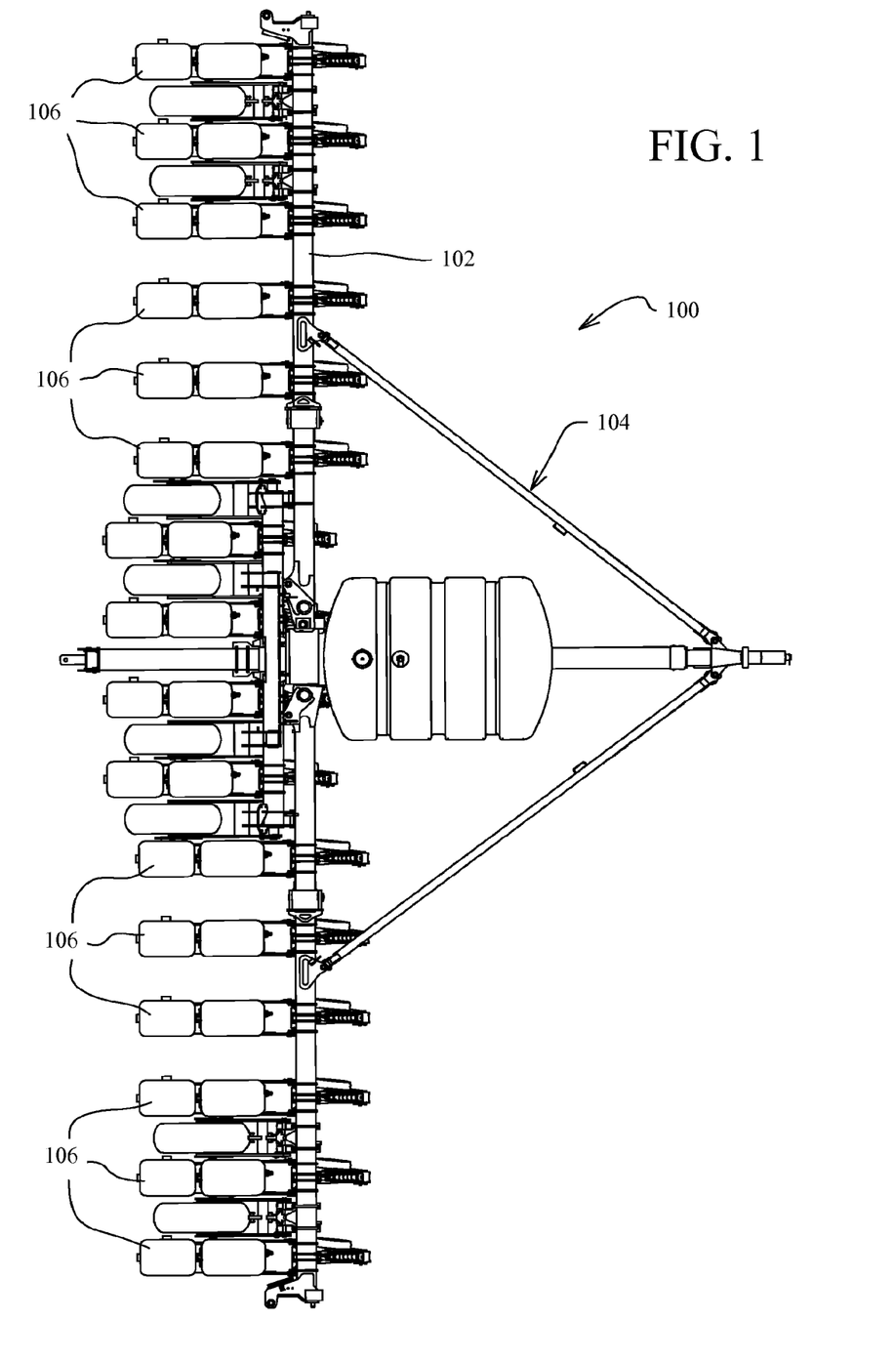
FIG. 1 shows a top view of one example of a planting machine.

FIG. 1 is a top view of one example of an agricultural planting machine 100. Planting machine 100 is a row crop planting machine that illustratively includes a toolbar 102 that is part of a frame 104. FIG. 1 also shows that a plurality of planting row units 106 are mounted to the toolbar. Machine 100 can be towed behind another machine, such as a tractor (a block diagram of which is discussed below with respect to FIG. 3.

Figure 2:
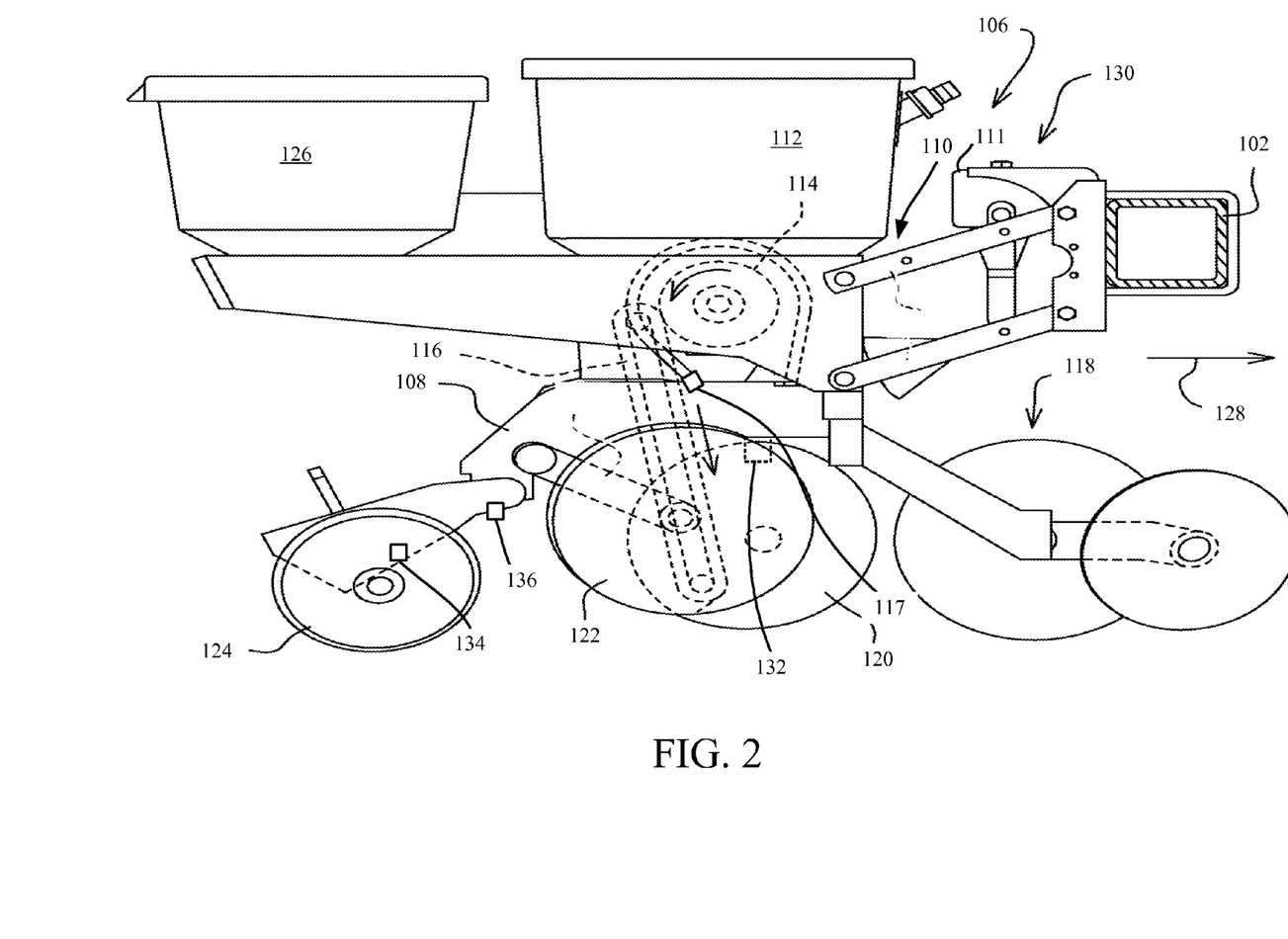
FIG. 2 shows a side view of one example of a row unit of the planting machine shown in FIG. 1.

FIG. 2 is a side view showing one example of a row unit 106, in more detail. FIG. 2 shows that each row unit 106 illustratively has a frame 108. Frame 108 is connected to toolbar 102 by a linkage shown generally at 110. Linkage 110 is illustratively mounted to toolbar 102 so that it can move upwardly and downwardly (relative to toolbar 102).

A downforce actuator 111 can be used to exert downforce on row unit 106, relative to toolbar 102. Downforce actuator 111 can include a downforce sensor that senses the downforce applied to row unit 106, with actuator 111.

In the example shown in FIG. 2, row unit 106 illustratively includes a seed hopper 112 that stores seed. It will be appreciated, of course, that row unit 106 need not have its own seed hopper, but can receive seed from a centrally located seed hopper that feeds seeds to some or all of the row units 106 on machine 100. Notwithstanding that, in the example shown in FIG. 2, the seed is provided from hopper 112 to a seed metering system 114 that meters the seed and provides the metered seed to a seed delivery system 116 that delivers the seed from metering system 114 to the furrow or trench generated by the row unit. A seed sensor 117 can also be disposed relative to either the seed metering system 114 or the seed delivery system 116, to sense seeds as they are delivered to the furrow or trench in the field. Sensor 117 can be, for instance, an optical sensor, or another type of sensor. As seeds pass sensor 117, sensor 117 can generate a signal pulse.

There are different types of seed metering systems 114 and seed delivery systems 116. In one example, each row unit 106 need not have its own seed metering system 114. Instead, metering or other singulation or seed dividing techniques can be performed at a central location, for groups of the row units 106. The metering systems 114 can include rotatable discs, rotatable concave or bowl-shaped devices, among others.

The seed delivery system 116 can be a gravity drop system that includes a seed tube that has an inlet positioned below the seed metering system 114. Metered seeds from the seed metering system 114 are dropped into the seed tube and fall (via gravitational force) through the seed tube into the seed trench. Other types of seed delivery systems (such as seed delivery system 116 shown in FIG. 2) are assistive systems, in that they do not simply rely on gravity to move the seed from the metering system 114 into the ground. Instead, such systems actively capture the seeds from the seed meter and physically move the seeds from the meter to a lower opening, where they exit into the ground or trench.

FIG. 2 also shows that, in one example, row unit 106 illustratively includes a row cleaner 118, a furrow opener 120, a set of gauge wheels 122, and a set of closing wheels 124. It can also include an additional hopper 126 that can be used to provide additional material, such as a fertilizer or another chemical.

In operation, as row unit 106 moves in the direction generally indicated by arrow 128, row cleaner 118 generally cleans the row and opener 120 opens a furrow in the row. Gauge wheels 122 illustratively control a depth of the furrow, and the seed is metered by metering system 114 and delivered to the furrow by delivery system 116. Closing wheels 124 close the trench over the seed. Downforce generator or actuator 111 controllably exerts downforce to keep the row unit in desired engagement with the soil.

It will be noted that the individual row units 106 or planting machine 100 (or both) can include a wide variety of different types of sensors (in addition to seed sensor 117) that sense variables that are indicative of the performance of planting machine 100. For instance, a row unit accelerometer 130 can sense acceleration of row unit 106. In the example shown in FIG. 2, accelerometer 130 is shown mounted to frame 108. This is only one example, and it can be mounted in other places as well.

Gauge wheels 122 not only control the depth of the furrow, but also act to firm ground on the sides of the furrow so that the sides do not collapse and re-fill the furrow before a seed is dropped into the furrow. In one example, it may be desirable to keep gauge wheels 122 in constant contact with the ground over which row unit 106 is traveling, but not to exert too much pressure so that they undesirably compact or otherwise affect the soil. Gauge wheels 122 can thus include a gauge wheel load sensor that senses the load exerted on the gauge wheels.

In one example, the force exerted by gauge wheels 122 on the ground can be directly sensed. In another example, the downward force exerted by downforce actuator 111 can be sensed. This force is offset by the upwardly directed forces acting on cleaner 118, furrow opener 120, and closing wheels 124. All of these can be sensed as well. The remaining force is the differential force, and this force acts on gauge wheels 122.

Row unit 106 can also illustratively include a seed trench depth sensor 132. Sensor 132 can be a wide variety of different types of sensors, such as an ultrasonic sensor, or another surface profiler or sensor array that senses a depth of the trench made by opener 120. Again, the placement of sensor 132 can be anywhere on row unit 106 so that it can sense the trench depth, after it is opened by opener 120, but before it is closed by closing wheels 124.

As mentioned above, closing wheels 124 can also include a separate downforce sensor 134. The downforce sensor 134 can sense a downforce exerted by closing wheels 124 on the soil over which they are traveling.

Further, row unit 106 (or planting machine 100) can also include a soil moisture sensor 136. Sensor 136 can be a probe that directly contacts the soil, or it can be another type of moisture sensor that senses a variable indicative of soil moisture, such as capacitance or another variable.

Again, it will be appreciated that, while the present discussion proceeds with respect to various sensors being placed on individual row units 106, that need not be the case. Instead, sensors can sense the variables for a collection or group of row units, or a single sensor can be provided to sense a variable for an entire planting machine. Thus, the sensors need not be mounted on the row units 106, themselves, but can be mounted at other locations on the planting machine 100. Those shown in FIG. 2 are shown for the sake of example only.

Figure 3:
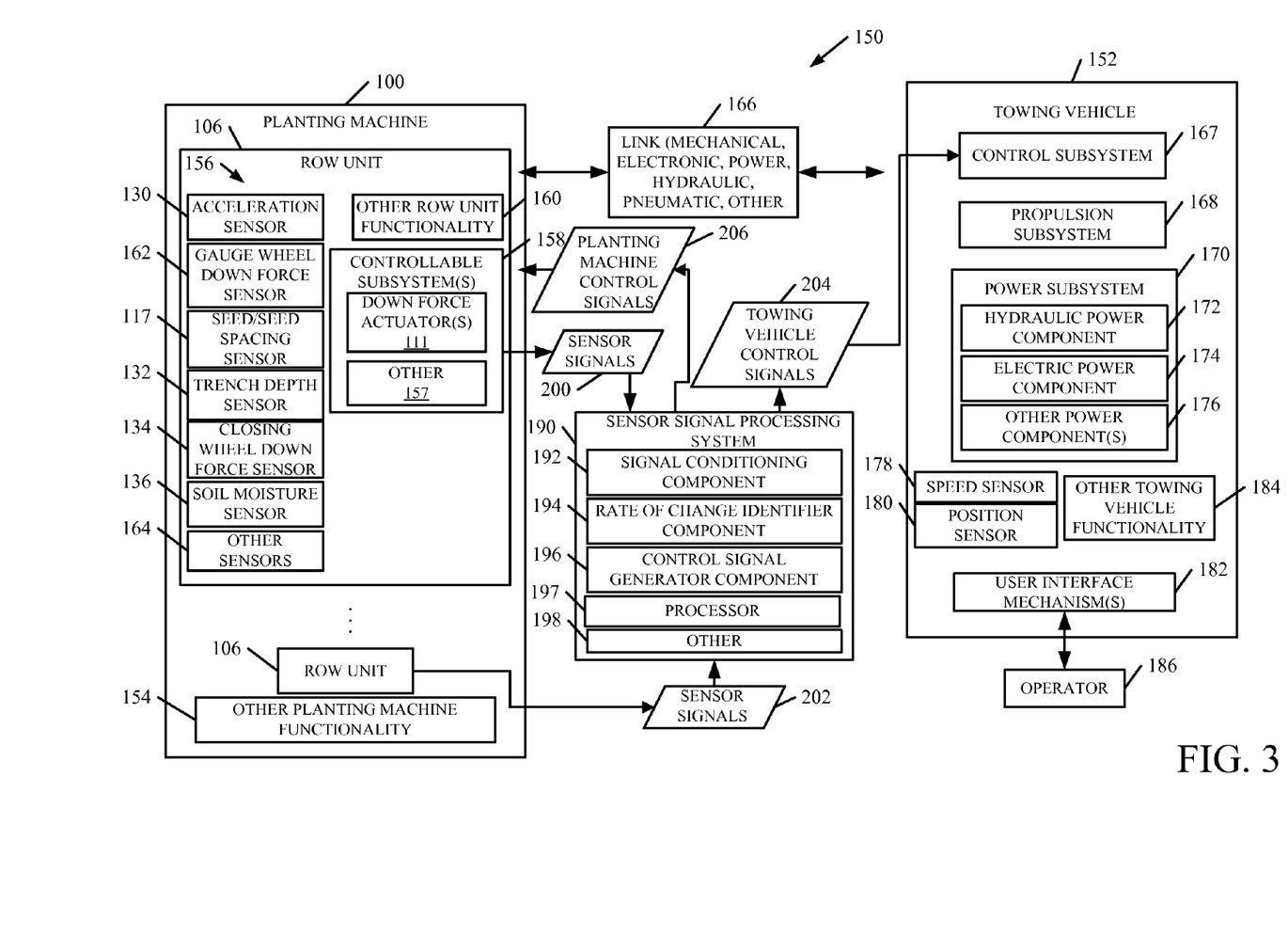
FIG. 3 is a block diagram of one example of various components of the planting machine shown in FIG. 1, and a towing vehicle that tows the planting machine.

FIG. 3 is a block diagram of one example of a planting system architecture 150. Architecture 150 shows a block diagram of one example of planting machine 100 being towed by towing vehicle 152. As described above with respect to FIGS. 1 and 2, planting machine 100 illustratively includes a set of row units 106 and it can include other planting machine functionality 154. Each row unit 106 can include a set of sensors 156, a set of controllable subsystems 158, and other row unit functionality 160, as described above with respect to FIG. 2. The set of sensors 156 can include the acceleration sensor 130, a gauge wheel downforce sensor 162, the seed sensor 117, trench depth sensor 132, closing wheel downforce sensor 134, soil moisture sensor 136, and it can include a wide variety of other sensors 164.

FIG. 3 shows that planting machine 100 is coupled to towing machine 152 by one or more links 166. The links can include a mechanical linkage so that towing vehicle 152 can pull planting machine 100. It can also include other links (such as a cable harness, wireless links, etc.) for transmitting electronic data, power, hydraulic fluid under pressure, pneumatic power, or a wide variety of other things.

In the example shown in FIG. 3, towing vehicle 152 illustratively includes a control subsystem 167, and propulsion subsystem 168 that drives a set of ground-engaging wheels or tracks that move towing vehicle 152 along the ground. The speed of towing vehicle 152 can be controlled by control subsystem 167. Subsystem 167 provides a speed control signal to the propulsion system to control the vehicle speed.

Vehicle 152 also illustratively includes power subsystem 170 that can have a variety of components, for providing a variety of different types of power. It can include a hydraulic power component 172 that provides hydraulic fluid under pressure to power various items. It can include an electric power component 174 that provides electric power, for instance, to power electric motors, etc. It can also provide a variety of other power components 176 that generate other types of power that can be used in planting system architecture 150.

In addition, vehicle 152 can include speed sensor 178, position sensor 180, one or more user interface mechanisms 182, and other towing vehicle functionality 184. Speed sensor 178 illustratively generates a speed signal indicative of the travel speed of towing vehicle 152. Position sensor 180 can include, for instance, a global positioning system (GPS) receiver, or a wide variety of other positioning sensors that can sense a geographical position of towing vehicle 152. User interface mechanisms 182 can include input mechanisms for receiving inputs from an operator 186 to control and manipulate towing vehicle 152 and planting machine 100. Such input mechanisms can include a steering wheel, foot pedals, joysticks, levers, push buttons, etc. Mechanisms 182 can also include output mechanisms for providing information to operator 186. Such output mechanisms can include display devices for displaying visual information, audio devices for generating audible information, and haptic feedback devices for generating haptic outputs.

FIG. 3 also shows that architecture 150 illustratively includes a sensor signal processing system 190. System 190 can reside on planting machine 100 or on towing vehicle 152. It illustratively includes signal conditioning component 192, rate of change identifier component 194, control signal generator 196, processor 197 and it can include other items 198.

Sensor signal processing system 190 illustratively receives sensor signals 200 and 202 from the various sensors on planting machine 100. Based on those sensor signals, it can illustratively generate towing vehicle control signals 204 that are provided to control subsystem 167 that is used to control controllable subsystems on towing vehicle 152.

By way of example, the towing vehicle control signals 204 can be speed control signals that are used to control the travel speed of towing vehicle 152, based upon the variable values indicated by the various sensor signals 200 and 202. Sensor signal processing system 190 can also illustratively generate planting machine control signals 206 that are provided to planting machine 100 to control controllable subsystems 158 (such as downforce actuator 111, or other controllable subsystems 157), on planting machine 100.

Figure 4:
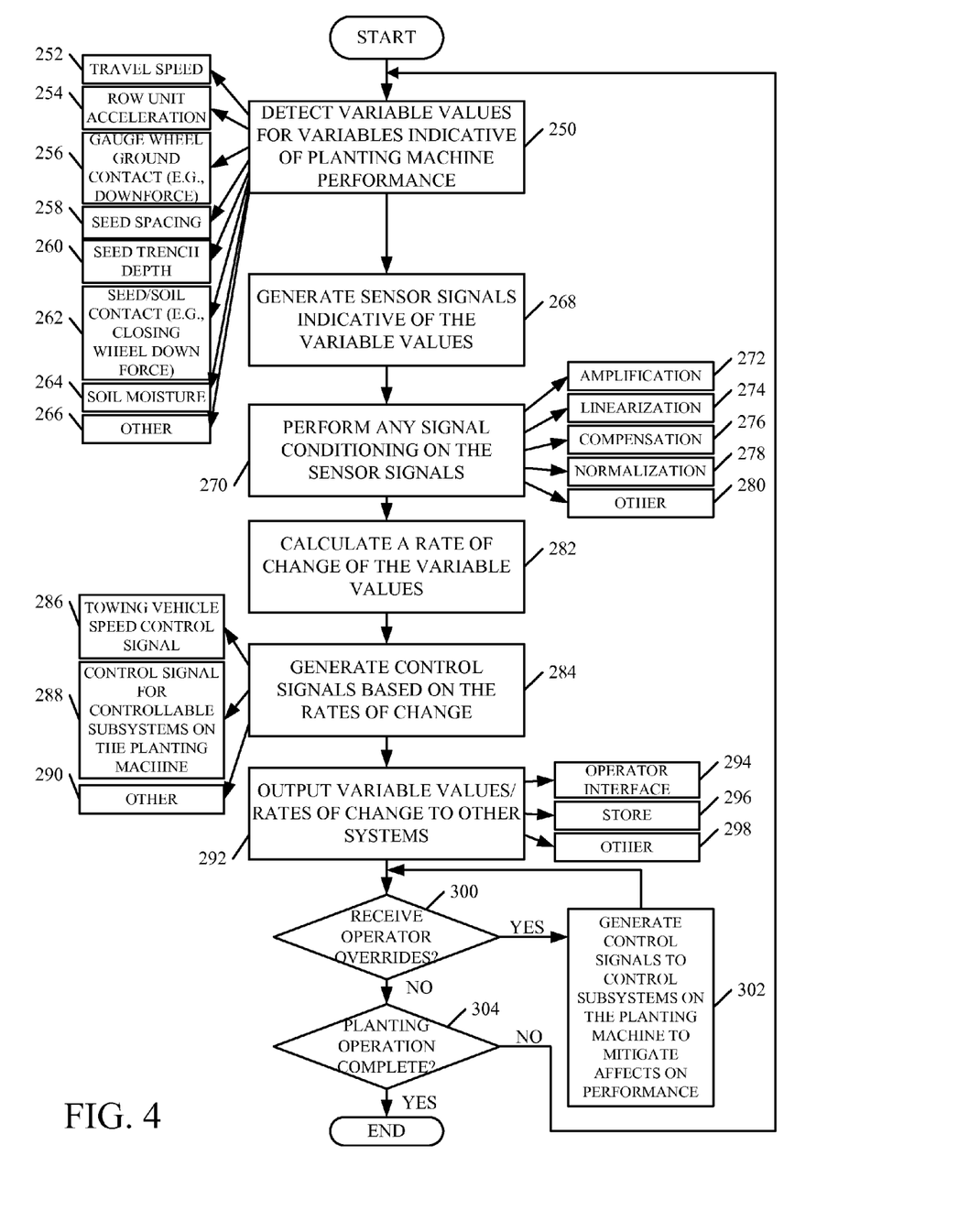
FIG. 4 is a flow diagram illustrating one example of how a towing vehicle can be controlled based on information sensed on a planting machine.

FIG. 4 is a flow diagram illustrating one example of the operation of sensor signal processing system 190, in generating control signals for controlling towing vehicle 152 and/or planting machine 100, based upon the sensor signals 200 and 202. FIGS. 3 and 4 will now be described in conjunction with one another.

It is first assumed that planting machine 100 and/or towing vehicle 152 have a plurality of different sensors for detecting variable values for variables that are indicative of the performance of planting machine 100. This is indicated by block 250 in FIG. 4. As mentioned above, the sensed variables can include a wide variety of different variables that are indicative of the performance of planting machine 100. Such variables can include, for instance, travel speed 252, row unit acceleration 254, a variable indicative of gauge wheel ground contact (e.g., gauge wheel downforce 256), seed spacing 258, seed trench depth 260, an estimate of the quality of seed-to-soil contact (such as by using the closing wheel downforce) 262, soil moisture 264, or other variables 266.

A brief discussion of some of these variables, and why they are indicative of the performance of planting machine 100, will now be provided. It will be appreciated, however, that these variables are examples only and different or additional variables can be sensed as well.

Row unit acceleration 254 can indicate an acceleration vector in x, y and z directions in space. By way of example, the z direction may be generally vertical to the ground surface. The acceleration data in each direction can be weighted. High acceleration values may indicate that row unit 106 is bouncing or otherwise traveling in an uneven fashion over the ground. This may indicate poor or uneven contact with the soil and thus poor planting performance. It thus may indicate that the travel speed of towing vehicle 152 (and thus planting machine 100) should be reduced. Alternatively, the downforce maybe increased.

The force exerted on the ground by gauge wheels 122 can also affect the performance of planting machine 100. Therefore, the gauge wheel ground contact force can be determined (e.g., it can be directly sensed or calculated based on the downforce exerted by downforce actuator 111). The rate at which the gauge wheel downforce is varying over time may indicate that the gauge wheel does not have relatively even contact with the ground. If the gauge wheel does not have even contact with the ground, then the profile characteristics of the trench may suffer. This may also provide the basis for controlling the speed of towing vehicle 152.

The seed spacing can affect the performance of planting machine 100 as well. Therefore, the rate of change of the seed spacing 258 (which can be calculated using the sensor signal from seed sensor 117 and the vehicle speed) can be used to control towing vehicle 152 or planting machine 100, or both.

The trench depth 260 can also affect the performance of planting machine 100. The rate of change of the trench depth over time may indicate that the speed of the towing vehicle 152 should be changed.

The seed-to-soil contact 262 can also affect yield. Therefore, if planting machine 100 is not planting the seeds such that they have good seed-to-soil contact, then the performance of planting machine 100 may be undesirable. During the planting machine operation, closing wheels 124 are attempting to collapse the trench and press the dirt onto the seeds so that the seed-to-soil contact is optimum, and uniform. The trench should also be collapsed with few or no air pockets which inhibit good seed-to-soil contact. One indication as to whether the closing wheels 124 are performing properly (and that there is good seed-to-soil contact 262) is the closing wheel downforce sensed by closing wheel downforce sensor 134. Thus the rate of change of the closing wheel downforce can be used to control towing vehicle 152 or planting machine 100, or both.

The soil moisture can also affect the performance of planting machine 100. For instance, if the soil moisture is relatively low, and the towing vehicle 152 is traveling at a relatively high speed, opening wheel 120 may throw the soil further out to the sides of the trench than if the soil is relatively moist. This may result in poor trench formation. Therefore, the soil moisture can also be used to control the speed of towing vehicle 152 (and hence planting machine 100).

In any case, block 250 in FIG. 4 indicates that a set of sensors detect a variety of different variables that are indicative of planting machine performance. The sensors then generate sensor signals, that are indicative of the variable values. This is indicated by block 268. The sensor signals are then provided to sensor signal processing system 190, where signal conditioning component 192 performs any desired signal conditioning on the sensor signals. This is indicated by block 270. The signal conditioning may include such things as amplification 272, linearization 274, compensation 276, normalization 278, or a wide variety of other conditioning 280.

Rate of change identifier component 194 then calculates a rate of change of some or all of the variable values, over a given time period. This is indicated by block 282. This is done because, in some examples, it may not be the raw variable value that is most meaningful. Instead, it may be the rate at which that variable is changing over time, that may provide better information for use in controlling towing vehicle 152, or planting machine 100. By way of example, the raw variable value that indicates gauge wheel downforce may not be as helpful as the rate at which that value changes over time. If it is changing over time, it may indicate that the gauge wheels are bouncing as they travel over the ground.

Control signal generator component 196 then generates control signals based on the rates of change of the sensed variables over the time period. This is indicated by block 284. By way of example, if the sensed variables are varying at a relatively high rate, this may indicate that the towing vehicle 152 is traveling too fast, and therefore a speed control signal may be generated to control towing vehicle 152 to slow down. On the other hand, if the variables are not varying over time in any significant way, this may indicate that the towing vehicle 152 can go faster, without negatively affecting the performance of planting machine 100. Therefore, the control signal may control towing vehicle 152 to speed up. Generating a towing vehicle speed control signal to control the speed of towing vehicle 152 is indicated by block 286.

In another example, control signal generator component 196 generates planting machine control signals 206. These signals are used to control the various controllable subsystems 158 on planting machine 100. This is indicated by block 288. For instance, if most of the sensed variables are not varying rapidly, but the gauge wheel downforce is varying rapidly, then component 196 may determine that it will not slow down towing vehicle 152, but instead it may control downforce actuator 111 on the corresponding row unit 106 to increase the gauge wheel downforce.

It will be noted that component 196 can generate other control signals as well. This is indicated by block 290.

The various data items generated by sensor signal processing system 190 can be output to other systems as well. For instance, the variable values or their rates of change, can be output to other systems, as indicated by block 292. They may be output to an operator interface mechanism 182, as indicated by block 294 in FIG. 4. They may be output to a storage system where they are stored, as indicated by block 296. They may be output to other systems 298 as well.

At some point, operator 186 may wish to override the control signals provided by sensor signal processing system 190. This can be done through any suitable user interface mechanism. For instance, assume that system 190 is providing speed control signals to towing vehicle 152 to control the speed of vehicle 152 to obtain optimal planting performance with planting machine 100. Operator 186 may wish to finish the planting operation quickly, for a variety of different reasons (such as if a rain storm is rapidly approaching, etc.). In that case, the operator 186 can provide a speed input to increase the travel speed of towing vehicle 152 (overriding the control signal generated by component 196), even though the performance of planting machine 100 may suffer.

When this happens, control signal generator component 196 can generate control signals to mitigate the affects of the operator override on the performance of planting machine 100. Receiving the operator override and generating control signals to mitigate its effect on performance are indicated by blocks 300 and 302 in FIG. 4.

By way of example, it may be that the operator override operates to increase the travel speed of towing vehicle 152 so that the row units 106 begin bouncing or riding more unevenly. In that case, control signal generator component 196 can generate planting machine control signals 206 to increase the downforce exerted by actuator 111 on the individual row units, in order to inhibit them from bouncing so much. This can tend to mitigate the affects of the operator override on the performance of planting machine 100.

Again, it will be noted that the present description has proceeded with respect to the rate of change of sensor signals on a towed planting machine being used to control subsystems of a towing vehicle. However, the rate of change of the sensed variables, that are sensed on a different towed implement (such as a baler, a tillage implement, etc.) or on a self-propelled machine, can also be used to control either the towing vehicle or the self-propelled machine.

It should also be noted that the entire process shown in FIG. 4 can be a continuous process, in which the variable values are detected and their rate of change is calculated, on a rolling basis. In another example, the process in FIG. 4 can be repeated periodically, or otherwise intermittently. At some point, however, the planting operation will be complete. This is indicated by block 304.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc. They can be located in the operator compartment of the towing vehicle, or elsewhere.

Note that other forms of the devices are also possible.

Figure 5:
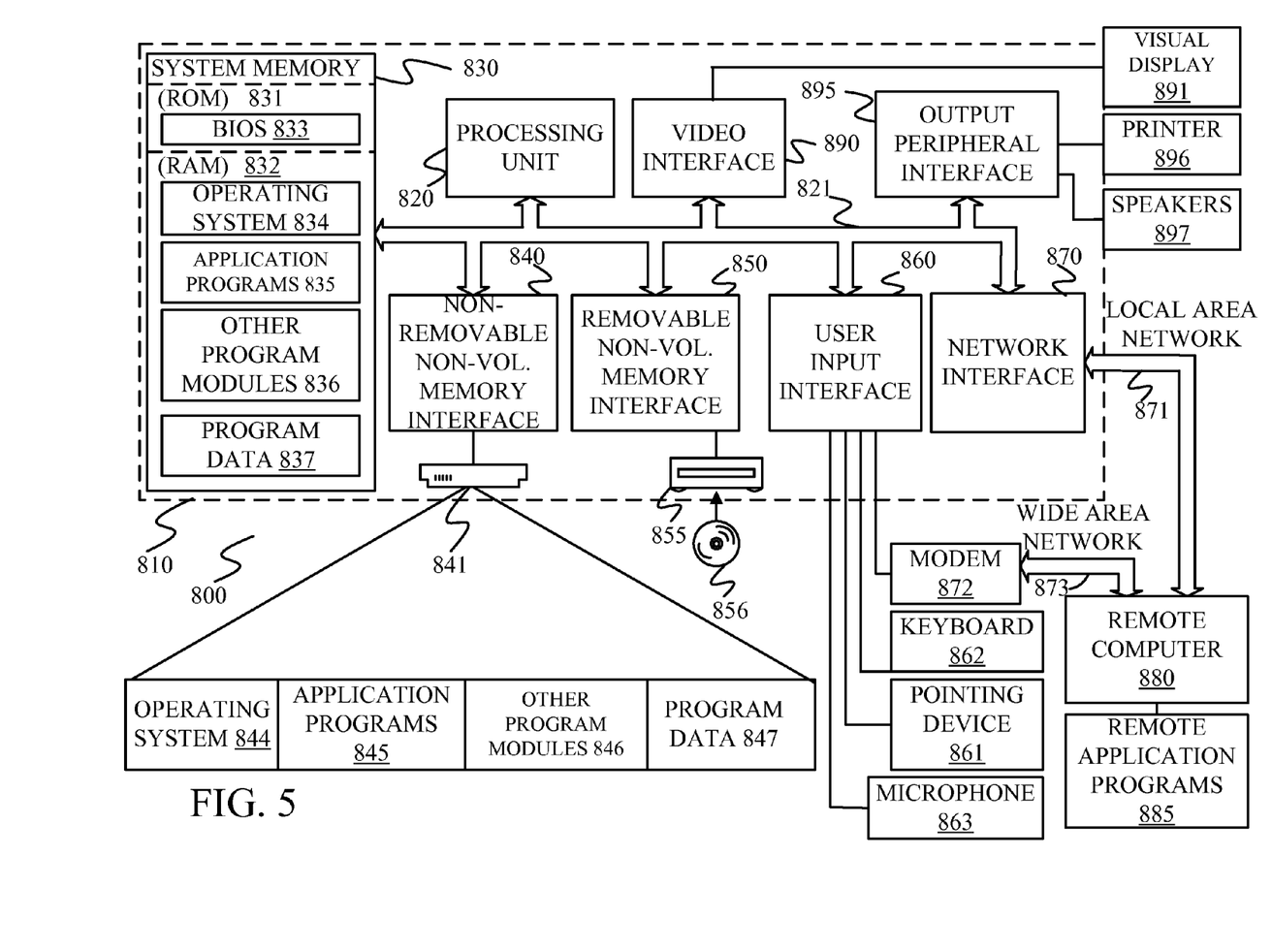
FIG. 5 is a block diagram of one example of a computing environment that can be used as a sensor signal processing system, or other system shown in FIG. 3.

FIG. 5 is one example of a computing environment in which elements of FIG. 3, or parts of it, (for example) can be deployed. With reference to FIG. 5, an example system for implementing some embodiments includes a general-purpose computing device in the form of a computer 810. Components of computer 810 may include, but are not limited to, a processing unit 820 (which can comprise processors 197 or other processors in architecture 150), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a steering wheel, brake pedal, levers, buttons, a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 5 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a control system for controlling an agricultural machine, comprising:
   a rate of change identifier component that receives a sensor signal from a sensor on a machine, the sensor signal being indicative of a sensed variable, the rate of change identifier component identifying a rate of change of the sensed variable based on the sensor signal; and
   a control signal generator component that generates a set of control signals that control a subsystem on the agricultural machine based on the identified rate of change of the sensed variable.

Example 2 is the control system of any or all previous examples wherein the machine that has the sensor comprises the agricultural machine and comprises a self-propelled agricultural machine with a propulsion subsystem, the control signal generator component generating the set of control signals to control the propulsion subsystem on the self-propelled agricultural machine.

Example 3 is the control system of any or all previous examples wherein the machine that has the sensor comprises a towed implement, towed by a towing vehicle, and wherein the agricultural machine comprises the towing vehicle.

Example 4 is the control system of any or all previous examples wherein the control system is located on the towed implement and has a communication link with a subsystem controller on the towing vehicle, the subsystem controller controlling the subsystem on the towing vehicle based on the set of control signals.

Example 5 is the control system of any or all previous examples wherein the control signal generator generates a speed control signal to control a propulsion subsystem of the towing vehicle to control a speed of the towing vehicle based on the identified rate of change of the sensed variable.

Example 6 is the control system of any or all previous examples wherein the towed implement comprises a planting machine comprising:
   a row unit that has a set of gauge wheels and wherein the sensor signal is indicative of a characteristic of contact between the set of gauge wheels and ground over which they are traveling.

Example 7 is the control system of any or all previous examples wherein the row unit comprises:
   a down force actuator that applies a down force to the row unit, and wherein the sensor signal is indicative of the down force applied by the down force actuator, the rate of change identifier component identifying the rate of change of the down force applied by the down force actuator.

Example 8 is the control system of any or all previous examples wherein the towed implement comprises a planting machine and wherein the sensor comprises:
   a seed sensor system that generates the sensor signal indicative of a seed spacing of seed being planted by the planting machine, the rate of change identifier component identifying a rate of change of the seed spacing.

Example 9 is the control system of any or all previous examples wherein the towed implement comprises a planting machine that generates a seed trench, and wherein the sensor comprises:
a seed trench depth sensor that generates the sensor signal indicative of a depth of the seed trench, the rate of change identifier component identifying a rate of change of the sensed depth of the seed trench.

Example 10 is the control system of any or all previous examples wherein the towed implement comprises a planting machine that plants seeds in soil, and wherein the sensor comprises:
a seed-to-soil contact sensor that generates the sensor signal indicative of a variable indicative of a characteristic of seed-to-soil contact, the rate of change identifier component identifying a rate of change of the sensed variable.

Example 11 is the control system of any or all previous examples wherein the planting machine comprises:
a closing wheel that exerts a closing wheel down force on soil over which it is traveling to close a seed trench, and wherein the seed-to-soil contact sensor comprises a closing wheel down force sensor that generates the sensor signal indicative of the closing wheel down force, the rate of change identifier component identifying a rate of change of the sensed closing wheel down force.

Example 12 is the control system of any or all previous examples wherein the sensor comprises:
a soil moisture sensor that generates the sensor signal indicative of soil moisture, the rate of change identifier component identifying a rate of change of the sensed soil moisture.

Example 13 is the control system of any or all previous examples wherein the towed implement comprises a planting machine and wherein the towing vehicle has an operator input mechanism that receives an operator override input overriding the set of control signals, the control signal generator component being configured to generate a set of planting machine control signals to control a subsystem on the planting machine based on the operator override input.

Example 14 is the control system of any or all previous examples wherein the control system is located on the towing vehicle.

Example 15 is a computer implemented method of controlling a towing vehicle that tows a planting machine, the method comprising:
receiving a sensor signal indicative of a sensed variable on the towing machine;
identifying a rate of change of the sensed variable based on the sensor signal;
generating a set of control signals based on the identified rate of change of the sensed variable; and
controlling a subsystem on the towing vehicle based on the set of control signals.

Example 16 is the computer implemented method of any or all previous examples wherein generating a set of control signals comprises:
generating a speed control signal, and wherein controlling comprises controlling a propulsion subsystem of the towing vehicle to control a speed of the towing vehicle based on the identified rate of change of the sensed variable.

Example 17 is the computer implemented method of any or all previous examples wherein the planting machine includes a row unit with a down force actuator that applies a down force to the row unit, wherein the sensor signal is indicative of the down force applied by the down force actuator, and wherein identifying a rate of change comprises:
identifying the rate of change of the down force applied by the down force actuator.

Example 18 is the computer implemented method of any or all previous examples wherein the sensor signal is indicative of a seed spacing of seed being planted by the planting machine, and wherein identifying a rate of change comprises:
identifying a rate of change of the seed spacing.

Example 19 is the computer implemented method of any or all previous examples wherein the planting machine comprises a closing wheel that exerts a closing wheel down force on soil over which it is traveling to close a seed trench, and wherein sensor signal is indicative of the closing wheel down force and wherein identifying a rate of change comprises:
identifying a rate of change of the sensed closing wheel down force.

Example 20 is an agricultural machine, comprising:
a propulsion system that drives the agricultural machine at a controllable travel speed; and
a control system comprising:
a rate of change identifier component that receives a sensor signal from a sensor, the sensor signal being indicative of a sensed variable, the rate of change identifier component identifying a rate of change of the sensed variable based on the sensor signal; and
a control signal generator component that generates a speed control signal that controls the propulsion system to control travel speed of the agricultural machine based on the identified rate of change of the sensed variable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for controlling an agricultural machine, comprising:
a rate of change identifier component that receives a force sensor signal from a force sensor on a machine, the received force sensor signal being indicative of a sensed variable force imparted by the machine, and wherein the rate of change identifier component is configured to identify a rate of change of the sensed variable force, wherein the rate of change is identified based on a first received force sensor signal received at a first time and a second received force sensor signal received at a second time, wherein the second time is different from the first time, and the rate of change is based on a difference between the first and second received force sensor signals; and
a control signal generator component that generates a set of control signals that control a subsystem on the agricultural machine, wherein the set of control signals is generated based on the identified rate of change of the sensed variable force.

2. The control system of claim 1 wherein the machine that has the force sensor comprises the agricultural machine and comprises a self-propelled agricultural machine with a propulsion subsystem, the control signal generator component generating the set of control signals to control the propulsion subsystem on the self-propelled agricultural machine.

3. The control system of claim 1 wherein the machine that has the force sensor comprises a towed implement, towed by a towing vehicle, and wherein the agricultural machine comprises the towing vehicle.

4. The control system of claim 3 wherein the control system is located on the towed implement and has a communication link with a subsystem controller on the towing vehicle, the subsystem controller controlling the subsystem on the towing vehicle based on the set of control signals.

5. The control system of claim 3 wherein the control signal generator generates a speed control signal to control a propulsion subsystem of the towing vehicle to control a speed of the towing vehicle based on the identified rate of change of the sensed variable force.

6. The control system of claim 3 wherein the towed implement comprises a planting machine comprising:
a row unit that has a set of gauge wheels and wherein the force sensor signal is indicative of a characteristic of contact between the set of gauge wheels and ground over which they are traveling.

7. The control system of claim 6 wherein the row unit comprises:
a down force actuator that applies a down force to the row unit, and wherein the force sensor signal is indicative of the down force applied by the down force actuator, the rate of change identifier component identifying the rate of change of the down force applied by the down force actuator.

8. The control system of claim 3 wherein the towed implement comprises a planting machine and further comprising:
a seed sensor system that generates a seed sensor signal indicative of a seed spacing of seed being planted by the planting machine, the rate of change identifier component identifying a rate of change of the seed spacing.

9. The control system of claim 3 wherein the towed implement comprises a planting machine that generates a seed trench, and further comprising:
a seed trench depth sensor that generates a seed depth sensor signal indicative of a depth of the seed trench, the rate of change identifier component identifying a rate of change of the sensed depth of the seed trench.

10. The control system of claim 3 wherein the towed implement comprises a planting machine that plants seeds in soil, and wherein the sensor comprises:
a seed-to-soil contact sensor that generates the force sensor signal indicative of a variable indicative of a characteristic of seed-to-soil contact, the rate of change identifier component identifying a rate of change of the sensed variable.

11. The control system of claim 10 wherein the planting machine comprises:
a closing wheel that exerts a closing wheel down force on soil over which it is traveling to close a seed trench, and wherein the seed-to-soil contact sensor comprises a closing wheel down force sensor that generates the force sensor signal indicative of the closing wheel down force, the rate of change identifier component identifying a rate of change of the sensed closing wheel down force.

12. The control system of claim 1 and further comprising:
a soil moisture sensor that generates a moisture sensor signal indicative of soil moisture, the rate of change identifier component identifying a rate of change of the sensed soil moisture.

13. The control system of claim 3 wherein the towed implement comprises a planting machine and wherein the towing vehicle has an operator input mechanism that receives an operator override input overriding the set of control signals, the control signal generator component being configured to generate a set of planting machine control signals to control a subsystem on the planting machine based on the operator override input.

14. The control system of claim 3 wherein the control system is located on the towing vehicle.

15. A computer implemented method of controlling a towing vehicle that tows a planting machine, the method comprising:
receiving an acceleration sensor signal indicative of a sensed acceleration of a portion of the planting machine from an acceleration sensor;
identifying a rate of change of the sensed acceleration based on a first received acceleration sensor signal received from the acceleration sensor at a first time and a second received acceleration sensor signal received from the acceleration sensor at a second time, wherein the second time is different from the first time, and the rate of change is based on a difference between the first and second received acceleration sensor signals;
generating a set of control signals based on the identified rate of change of the sensed acceleration; and
controlling a subsystem on the towing vehicle based on the set of control signals.

16. The computer implemented method of claim 15 wherein generating a set of control signals comprises:
generating a speed control signal, and wherein controlling comprises controlling a propulsion subsystem of the towing vehicle to control a speed of the towing vehicle based on the identified rate of change of the sensed acceleration.

17. The computer implemented method of claim 16 wherein the planting machine includes a row unit with a down force actuator that applies a down force to the row unit, and further comprising receiving a force sensor signal indicative of the down force applied by the down force actuator; and
identifying a rate of change of the down force applied by the down force actuator.

18. The computer implemented method of claim 15 wherein the planting machine comprises a closing wheel that exerts a closing wheel down force on soil over which it is traveling to close a seed trench, and further comprising receiving a force sensor signal indicative of the closing wheel down force and wherein identifying a rate of change further comprises:
identifying a rate of change of the sensed closing wheel down force.

19. An agricultural machine, comprising:
a propulsion system that drives the agricultural machine at a controllable travel speed; and
a control system comprising:
a rate of change identifier component that receives a seed spacing sensor signal from a seed sensor, the received seed spacing sensor signal being indicative of a sensed seed spacing, and wherein the rate of change identifier component is configured to identify a rate of change of the sensed seed spacing based on a first received seed spacing sensor signal received from the seed sensor at a first time and a second received seed spacing sensor signal received from the seed sensor at a second time, wherein the second time is different from the first time, and the rate of change is based on a difference between the first and second received seed spacing sensor signals; and a control signal generator component configured to, based on the identified rate of change of the sensed seed spacing, generate a speed control signal that controls the propulsion system to control travel speed of the agricultural machine, such that the travel speed is, at least in part, based on the identified rate of change of the sensed seed spacing.

20. The agricultural machine of claim 19 wherein the rate of change identifier component is configured to receive a trench depth sensor signal indicative of a sensed trench depth of a trench into which seeds are placed and to identify a rate of change of the sensed trench depth based on the trench depth sensor signal, the control signal generator being configured to generate a control signal based, at least in part, on the rate of change of the sensed trench depth.

* * * * *